US007906729B2

(12) United States Patent
Robertson et al.

(10) Patent No.: US 7,906,729 B2
(45) Date of Patent: Mar. 15, 2011

(54) REPOSITIONABLE INSULATOR

(75) Inventors: George B. Robertson, Cordova, TN (US); Richard Von Rotz, Collierville, TN (US); Michael Pratt, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 504 days.

(21) Appl. No.: 12/074,894

(22) Filed: Mar. 7, 2008

(65) Prior Publication Data
US 2008/0223613 A1    Sep. 18, 2008

Related U.S. Application Data

(60) Provisional application No. 60/906,997, filed on Mar. 14, 2007.

(51) Int. Cl.
*H02G 15/02* (2006.01)

(52) U.S. Cl. ............... 174/75 R; 174/152 G; 174/153 G; 174/656; 174/156; 16/2.1; 16/2.2; 439/777

(58) Field of Classification Search ................ 174/75 R, 174/135, 152 G, 153 G, 152 R, 656, 664, 174/156, 155, 84 C, 86, 650, 74 R; 16/2.1, 16/2.2; 439/777, 794, 713, 797, 798, 13, 439/883, 418
See application file for complete search history.

(56) References Cited

U.S. PATENT DOCUMENTS

| | | | |
|---|---|---|---|
| 2,597,286 A | 5/1952 | Burgess | |
| 3,161,906 A * | 12/1964 | Yarm | ............................ 16/2.1 |
| 3,171,888 A | 3/1965 | Stanback | |
| 3,836,269 A * | 9/1974 | Koscik | ............................ 16/2.2 |
| 3,891,298 A | 6/1975 | Yorgin et al. | |
| 3,958,300 A * | 5/1976 | Tanaka | ...................... 174/153 G |
| 4,077,697 A | 3/1978 | Yates | |
| 4,552,430 A | 11/1985 | Myers | |
| 4,603,376 A | 7/1986 | Maier | |
| 4,751,049 A | 6/1988 | Shannon | |
| 4,809,132 A | 2/1989 | Palmieri | |
| 5,005,104 A | 4/1991 | Grunert et al. | |
| 5,036,164 A | 7/1991 | Schrader et al. | |
| 5,107,396 A | 4/1992 | Rosen et al. | |
| 5,639,993 A * | 6/1997 | Ideno et al. | ............... 174/153 G |
| 5,928,006 A | 7/1999 | Franks, Jr. | |
| 5,931,708 A | 8/1999 | Annas et al. | |
| 6,218,625 B1 * | 4/2001 | Pulaski | ..................... 174/153 G |
| 6,291,774 B1 * | 9/2001 | Williams | ...................... 174/135 |
| 6,547,585 B2 | 4/2003 | Bradley et al. | |
| 6,579,131 B1 | 6/2003 | Ashcraft et al. | |
| 6,627,817 B1 * | 9/2003 | Kortenbach | ................ 174/74 R |
| 6,857,900 B2 | 2/2005 | Kleeberger et al. | |
| 7,081,027 B2 | 7/2006 | Woodward | |
| 7,102,080 B2 * | 9/2006 | Nakamrura | ............... 174/153 G |

* cited by examiner

*Primary Examiner* — Angel R Estrada
(74) *Attorney, Agent, or Firm* — Hoffman & Baron, LLP

(57) ABSTRACT

A repositionable insulator housing for an angle connector formed from first and second housing sections that are joined together. Each housing section has an exterior surface and a base portion that includes an end wall, a pair of opposing side walls and a back wall. Each of the end walls and pairs of opposing side walls extend from the back walls to form open sides and open ends of the housing sections. When the two housing sections are joined together, the base sections form an enclosure with a pair of apertures in opposing walls. The two housing sections enclose an angle connector so that the open sides correspond and the first open ends form an opening in the housing. The pair of apertures are aligned and adapted to receive an elongated metal rod and the opening in the housing is adapted to receive a conductor.

31 Claims, 8 Drawing Sheets

REPOSITIONABLE INSULATOR

This application claims priority from provisional application Ser. No. 60/906,997, filed on Mar. 14, 2007, which is incorporated herein in its entirety.

FIELD OF THE INVENTION

The present invention relates to insulators used with angle connectors for heavy gauge wires and cables. The angle insulators can be used in confined spaces that do not easily allow conventional insulation, such as electrical tape, to be applied to connections for the wires and cables.

BACKGROUND OF INVENTION

The present invention is an insulator for modular multi-tap electrical connector assemblies, which are used for quick connection and disconnection of a plurality of wires or cables in a limited space. In particular, the present invention relates to a repositionable insulator for modular multi-tap electrical connector assemblies that can be easily installed on the connectors in a minimum amount of space, while not interfering with the operation of the connectors.

In general, the prior art teaches the use of electrical tape to provide insulation for wires and connectors. If the connection is accessible, a technician has to cut and/or remove tape with every repositioning of a connector. This method is time consuming and the use of a razor knife risks accidental cutting of the cable sheathing or injuries to the technician. Moreover, in cramped locations, access to the connectors is limited or non-existent. Therefore, the application of electrical tape to connections to act as an insulator is often difficult, if not impossible.

Many wiring applications require numerous connections to be made in a relatively limited amount of space. A wide variety of terminal blocks and connectors have been developed for such applications and they are very useful for small gauge wires. However, larger gauge wires and cables require more space and present a variety of problems when the space around the connectors is restricted. One problem is that larger wires and cables have large bend radii, which makes it difficult to connect them to a terminal when they have to be bent. In order to overcome this problem, multiple large gauge wires and/or cables are often connected to an elongated metal rod. This allows a plurality of connections to be made in a relatively limited space.

Most of the connectors now in use make a straight line connection between the electrical wire/cable and the electrical device to which they are terminated. However, for some applications, a straight line connection cannot be used and the wire/cable needs to be introduced at some angle (typically up to 90°) to the electrical device. Quite often, the wires/cables are bent in order to make such a connection. Bending large diameter wires/cable in this manner may cause the insulation around the wire/cable to crack or break which can lead to problems due to insufficient insulation covering the cable. Moreover, once the connectors are installed, they are very difficult to insulate because they are positioned so closely together.

One solution to this problem is to cast a right angle (or any other desired angle) connector so that the angular transition is made in the connector instead of the cable. However, this requires an individually cast part to be formed for each specific application. Another solution uses right angle electrical contacts in electrical connector housings to make right angle transitions. Such contacts are disclosed in U.S. Pat. Nos. 4,050,769 and 4,080,041. Right angle contacts of this type may also be used for individually coupling closely grouped cable terminations as disclosed in U.S. Pat. No. 4,552,430. Terminations of this type include a cable connection portion at one end and a termination portion at the other end and an elongate metal rod connecting the two ends. The rod can be constructed so that the cable connection end and the termination end are disposed at a right angle. The electrical terminal described in the '430 patent requires a complex connection device which attaches to one end of the metal rod for connecting the electrical cable. This arrangement is costly due in part to the additional number of components and the more complex design. Moreover, using electrical tape to insulate these connectors is difficult because of the shape of the connectors and may affect the operation of the connectors if the tape prevents them from moving.

Users of electrical terminals for large size wires/cables have applications where it is necessary to connect several different size wires/cables in a limited space and it is necessary to use a series of closely spaced connectors. Various attempts have been made to insulate these connectors without using an inordinate amount of space, but for the most part they have been unsatisfactory. Accordingly, there is a need for a repositionable insulator for these connectors that can be quickly and easily installed in a limited space.

SUMMARY OF THE INVENTION

In accordance with the present invention, a repositionable insulator housing (also referred to herein as an "insulator") for an angle connector is provided. A first embodiment of the insulator housing includes: a first housing section having a first exterior surface and including a first end wall and a first pair of opposing side walls extending from a first back wall to form a first open side and a first open end, and wherein the first back wall has a first aperture; and a second housing section having a second exterior surface and including a second end wall and a second pair of opposing side walls extending from a second back wall to form a second open side and a second open end, wherein the second back wall has a second aperture. The first and second housing sections are joined together so that the first open side is adjacent to the second open side and the first and second open ends form an opening in the housing. Preferably, the first open side is defined by a first edge and the second open side is defined by a second edge. The first and second housing sections are joined together by contacting the first and second edges. When the insulator housing is formed, the first and second apertures are aligned and adapted to receive an elongated metal rod and the opening is adapted to receive a conductor.

The first housing section can include a first plurality of fingers extending from the first back wall and the first pair of opposing side walls at the first open end and the second housing section can include a second plurality of fingers extending from the second back wall and the second pair of opposing side walls at the second open end. Each of the first plurality of fingers and each of the second plurality of fingers has a base and a tip opposite the base. The base of each of the fingers is joined to the first or second pairs of opposing side walls or the first or second back walls and the tips of the fingers define the opening in the housing. One or more slots can be formed on the first exterior surface and/or the second exterior surface for receiving one or more cable ties to secure the first and second housing sections together. In another embodiment, one or more slots or latching members are formed on the first exterior surface and one or more slots or latching members are formed on the second exterior surface.

The one or more latching members engage the one or more slots to secure the first and second housing sections together.

In a second embodiment, the repositionable insulator housing includes: a first housing section having a first exterior surface and a first base portion, the first base portion including a first back wall, a first end wall opposite a first open end and a first pair of opposing side walls, wherein the first end wall and the first pair of opposing side walls extend from the first back wall to a first edge, and wherein corresponding portions of the first edge on the first pair of opposing side walls are concave and have a substantially semi-circular shape; and a second housing section having a second exterior surface and a second base portion, the second base portion including a second back wall, a second end wall opposite a second open end and a second pair of opposing side walls, wherein the second end wall and the second pair of opposing side walls extend from the second back wall to a second edge, and wherein corresponding portions of the second edge on the second pair of opposing side walls are concave and have a substantially semi-circular shape. The first and second housing sections are joined together so that the first edge correspondingly contacts the second edge to form the insulator housing. The first and second open ends form an opening in the housing, which is adapted to receive an electrical conductor. The first and second concave edges define a pair of apertures that are aligned and adapted to receive an elongated metal rod and the opening is adapted to receive an electrical conductor.

The first housing section of the insulator housing can include a first transitional wall having a first opening opposite the first end wall and the second housing section can include a second transitional wall having a second opening opposite the second end wall. A first mid-portion extends from the first transitional wall and is in communication with the first base portion through the first opening and a second mid-portion extends from the second transitional wall and is in communication with the second base portion through the second opening. The first housing section can include a first plurality of fingers extending from the end of the first mid-portion opposite the first transitional wall and the second housing section can include a second plurality of fingers extending from the end of the second mid-portion opposite the second transitional wall. Each of the first plurality of fingers and each of the second plurality of fingers has a base and a tip opposite the base. Each of the bases is joined to the first or second mid-portion and the tips define an insulator housing opening when the first and second housing sections are joined together.

One or more slots can be formed on the first and/or second exterior surface(s) for receiving one or more cable ties to secure the first and second housing sections together. In another embodiment, one or more slots or latching members can be formed on the first exterior surface and one or more slots or latching members are formed on the second exterior surface. The one or more latching members engage the one or more slots to secure the first and second housing sections together.

A third embodiment of the insulator housing includes a housing section and a lid. The housing section has an exterior surface and a base portion that includes a back wall, an end wall opposite an open end and a pair of opposing side walls. The end wall and the pair of opposing side walls extend from the back wall to an edge. Corresponding portions of the edge on the opposing side walls are concave. The lid is substantially flat and has a top surface and an outer perimeter that substantially corresponds to the edge of the housing. The housing section and the lid are joined together so that the outer perimeter contacts the edge to form the insulator housing and the open end forms an opening in the housing that is adapted to receive an electrical conductor. The first and second concave edges together with the lid define a pair of apertures. These apertures are aligned and adapted to receive an elongated metal rod.

The housing section can include a transitional wall having an opening opposite the end wall. A first mid-portion extends from the transitional wall and is in communication with the base portion through the opening. Preferably, the housing section includes a plurality of fingers extending from the end of the mid-portion opposite the transitional wall. Each of the plurality of fingers has a base and a tip opposite the base. Each of the bases is joined to the mid-portion and the tips of the fingers define an insulator housing opening when the lid and the housing section are joined together.

In some embodiments, one or more slots are formed on the exterior surface and receive one or more cable ties to secure the lid and the housing section together. In another embodiment, one or more slots or latching members are formed on the exterior surface of the housing which correspond(s) to one or more latching members or slots formed on the perimeter of the lid. The one or more latching members engage(s) the one or more slots to secure the lid to the housing section.

A fourth embodiment of the insulator housing is an insulator housing assembly for angle connectors. The assembly includes: one or more angle connectors, wherein each angle connector has an aperture extending therethrough; one or more repositionable insulator housings adapted to accommodate an angle connector; and an elongated metal rod having a first end, a second end and a longitudinal axis. The elongated metal rod extends through the aperture and electrically contacts each of the one or more angle connectors and also passes through the one or more repositionable insulator housings.

The insulator housing assembly can include one or more insulator housings selected from the three embodiments of insulator housings described above. The insulator housings are adapted to enclose the angle connectors, which are rotatable around the longitudinal axis of the elongated metal rod.

The insulator housing assembly can include an electrically insulated cap on at least one end of the elongated metal rod. The insulator housing assembly can also include one or more electrically insulated spacers that have an opening for receiving the elongated metal rod. The spacers are positioned on the elongated metal rod between adjacent angle connectors or between an angle connector and an electrically insulated cap on an end of the rod.

In a fifth embodiment is a repositionable insulator housing kit for angle connectors, which includes: one or more repositionable insulator housings, one or more electrically insulated caps; and one or more electrically insulated spacers. The insulator housings can be selected any of the three embodiments of insulator housings described above. Each of the electrically insulated caps has an opening for receiving an end of an elongated metal rod and each of the electrically insulated spacers has an opening therethrough for the passage of the elongated metal rod.

Each of the insulator housings includes at least a first housing section and a second housing section or lid as described in detail above. The elongated metal rod is made from an electrically conductive metal and includes a first end, a second end and a longitudinal axis. The elongated metal rod extends through the aperture(s) in the one or more angle connectors and through the apertures in the one or more housings and electrically contacts each of the one or more angle connectors. The one or more repositionable insulator housings and the one or more angle connectors therein are rotatable around the longitudinal axis of the elongated metal rod. Preferably, the angle connectors are rotatable 360 degrees around the longitudinal axis of the elongated metal rod. The elongated metal rod can have an electrically insulated cap on at least one end. The housing sections, lid, cap and spacers disclosed herein are preferably made from an electrically insulating material, most preferably a polyethylene, a polypropylene, a polycarbonate or nylon.

BRIEF DESCRIPTION OF THE FIGURES

The preferred embodiments of the insulator housings of the present invention, as well as other objects, features and advantages of this invention, will be apparent from the accompanying drawings wherein.

DETAILED DESCRIPTION OF THE INVENTION

Figure 1:
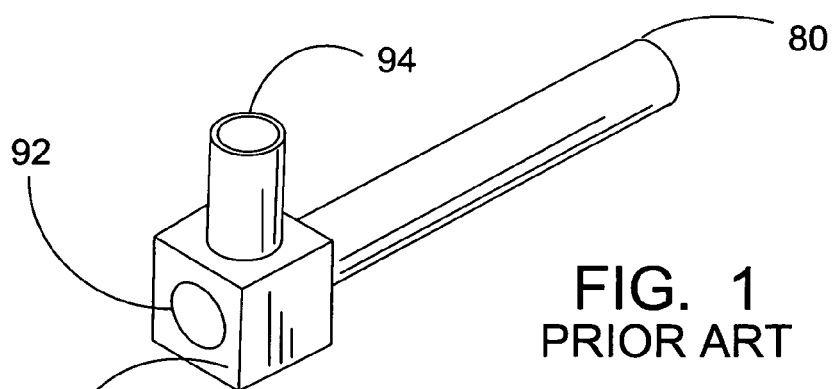
FIG. 1 shows a prior art angle connector installed on a metal rod.

The present invention is directed to insulators that are used with angle connectors for large gauge wires and cables. These insulators are placed over the angle connectors and prevent the connectors from electrically contacting adjacent connectors and/or equipment, as well as personnel. The insulators conform to the shape of the angle connectors so that they occupy a minimum amount of space. This is an important consideration in applications where a large number of connectors are terminated in a limited space and there is insufficient room to insulate the connections using conventional methods, such as wrapping electrical tape around the connectors.

In one embodiment, the insulators are placed over angle connectors, such as the connectors disclosed in U.S. Pat. No. 7,081,027 to Woodward, which is incorporated herein by reference in its entirety. These angle connectors have a six-sided body with an aperture that extends through a pair of opposing side walls of the body. One or more of the remaining side wall surfaces has a male pin or compression fitting for connecting a wire or cable. An elongated metal rod is inserted through the aperture in the connector and contacts the internal walls of the aperture to make electrical contact with the connector body. The elongated metal rod can be used as a power bus or a ground bus. However, how the elongated metal rod is used does not limit the scope of the invention in any way. In a typical installation, the insulators are fitted onto one or more of the angle connectors before they are mounted on the elongated metal rod.

Once installed, the insulator and connector can be rotated around the axis of the elongated metal rod, which passes through the aperture in the connector. The connector and insulator can be easily moved along the metal rod and/or repositioned by rotating around the longitudinal axis of the rod over a full 360-degree range. The insulators electrically isolate the connectors and prevent short circuits and electrical shocks to personnel. In addition, the insulators on the connectors can have one or more spacers installed between adjoining insulators to make the connectors more accessible to the user and to allow room for the subsequent addition of insulated connectors.

The insulators are made from electrically insulating material, preferably thermoplastic materials, most preferably different types of polyethylene, polypropylene, polycarbonate and nylon. However, the invention is not limited by the type of material used and any material with insulating properties sufficient to substantially prevent the transmission of electricity can be used. When the insulators are made from a thermoplastic material, a variety of different molding and extrusion methods can be used. All of these methods are well known to those skilled in the art. Some of the materials that can be used for the insulators and the methods of manufacture are described in U.S. Pat. No. 7,094,972 to Rodrigues et al., which is incorporated herein in its entirety.

In a preferred embodiment, the insulators are formed by two substantially symmetrical housing sections which are mated together. The insulators so formed have three portions. The first portion of the insulator covers the six-sided body of the angle connector and is substantially block-shaped. Two opposing side wall surfaces of the first portion have apertures so that an elongated metal rod can pass through the insulator and contact the connector. In one embodiment, an aperture is formed in the back wall of each of the housing sections. In another embodiment, corresponding opposing side walls of each housing section have a substantially semi-circular opening at the edge. When the two housing sections are joined together to form the insulator, the semi-circular openings form a substantially round aperture. The second portion of the insulator is substantially cylindrical with the first end of the cylinder extending from the first portion and corresponding to the male pin or compression fitting of the connector. The third portion of the insulator extends inwardly from the other end of the cylindrical second portion and is formed by a plurality of fingers. The fingers contact the wire/cable that is inserted into the connector and help prevent dirt and other foreign material from coming in contact with the connector.

The first and second portions can include connecting means for attaching the first and second housing sections together. In a preferred embodiment, the connecting means can include one or more slots on the exterior surface of one of the housing sections and one or more latching members on the exterior surface of the other housing section. In another embodiment, each of the housing sections includes one or more slots and a cable tie is passed through the slots and fastened to secure the two housing sections together. In still another embodiment, cable ties can be used to secure the two housing sections together, without using slots or other fastening means on either of the two housing sections. Other suitable methods for securing the first and second housing sections together can be used and the invention is not limited by how the two housing sections are secured together.

Figure 2:
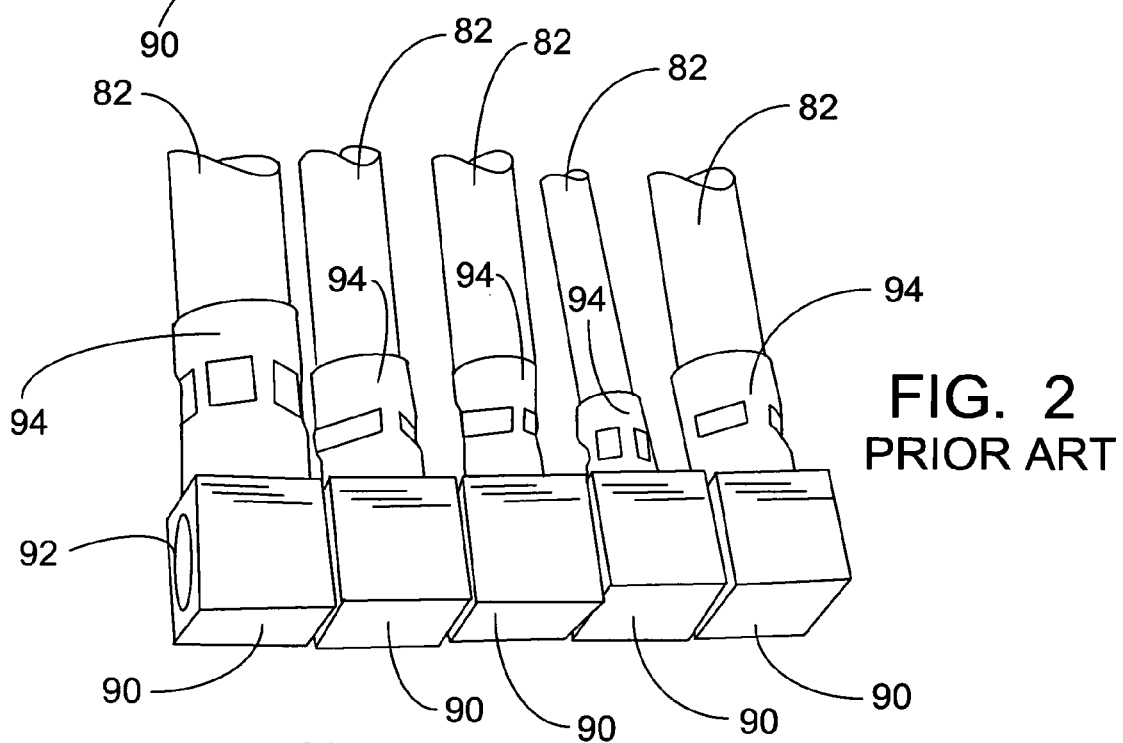
FIG. 2 shows five cables connected to prior art angle connectors.
Figure 3:
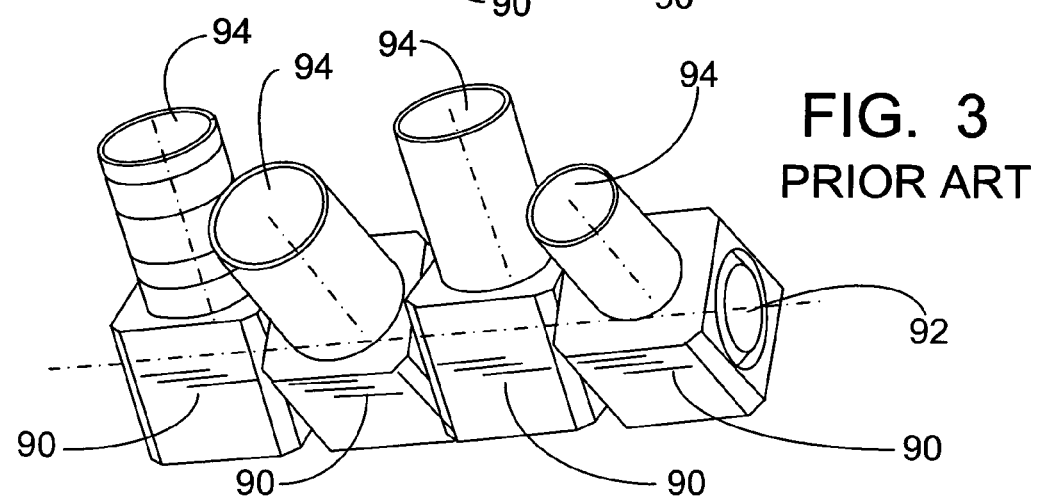
FIG. 3 shows prior art angle connectors rotated at different angles around the axis of the apertures in the bodies.

FIGS. 1-3 show the prior art connectors 90 disclosed in U.S. Pat. No. 7,081,027 to Woodward. The connectors 90 are substantially block or cube-shaped and have an aperture 92 that passes through two opposing side wall surfaces. An elongated metal rod 80 is inserted through the apertures 92 and makes electrical contact with the body of the connectors 90. A female compression fitting 94 on one of the remaining four side wall surfaces of the connectors 90 is used to connect wire/cables 82 to the elongated metal rod 80.

Figure 4:
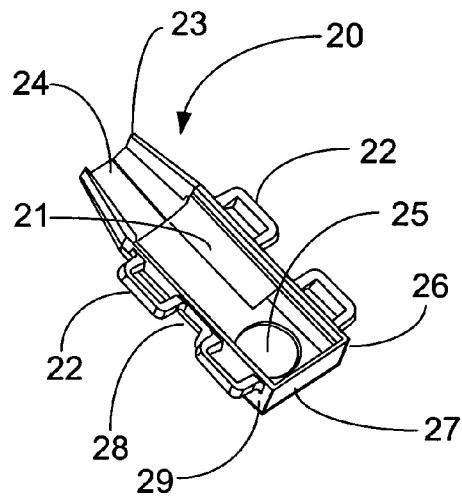
FIG. 4 is a perspective view of a first housing section for a first embodiment of an insulator housing.
Figure 5:
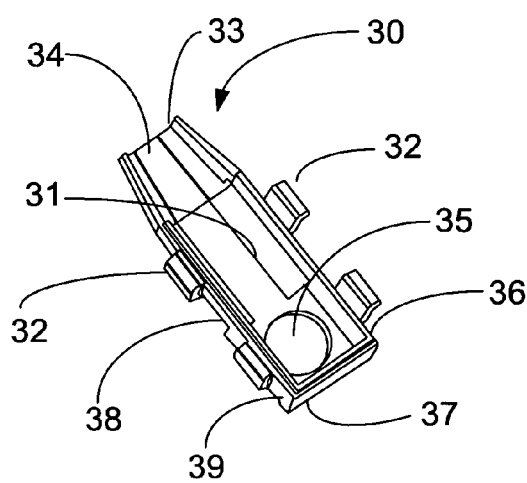
FIG. 5 is a perspective view of a second housing section for the first embodiment of an insulator housing.

FIGS. 4 and 5 show the first and second housing sections 20, 30 of the insulator housing 10. The first housing section 20 has three portions along its longitudinal axis: the first or base portion 26, which is substantially rectangular in shape and has an aperture 25; the second or mid-portion 28; and the third or end portion 24 formed by a plurality of fingers 23 that extend inwardly. A plurality of slots 22 for attaching the first housing section 20 to the second housing section 30 are positioned on the exterior surface of the mid-portion 28 and the base portion 26. The base portion 26 has a substantially flat end wall 27, three substantially flat side walls 29 and an open side 21. The aperture 25 is in the side wall 29 opposite the open side 21. The mid-portion 28 can be formed by a plurality of substantially flat surfaces or a curved wall that extends about 180 degrees between the opposing side edges.

FIG. 5 shows the second housing section 30, which is substantially the same as the first housing section 20 and has three portions along its longitudinal axis: the first or base portion 36, which is substantially rectangular in shape and has an aperture 35; the second or mid-portion 38; and the third or end portion 34 formed by a plurality of fingers 33 that extend inwardly. In addition, the exterior surface of the second housing section 30 has a plurality of latching members 32, which correspond with the slots 22 on the first housing section 20. When the first housing section 20 and the second housing section 30 are placed over a connector 90, the latching members 32 engage the slots 22. The base portion 36 has a substantially flat end wall 37, three substantially flat side walls 39 and an open side 31. The aperture 35 is in the side wall 39 opposite the open side 31. The mid-portion 38 can be formed by a plurality of substantially flat surfaces or a curved wall that extends about 180 degrees between the opposing side edges.

Figure 6:
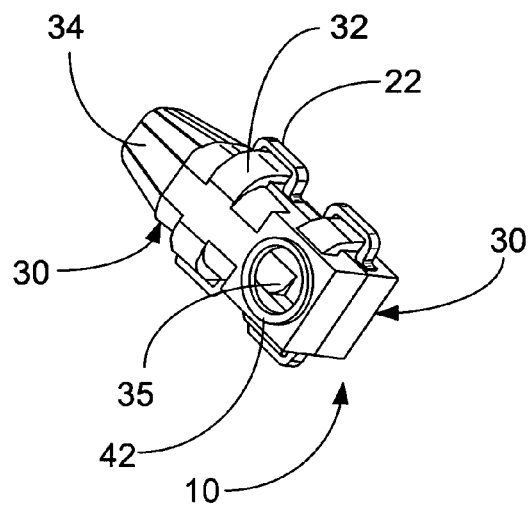
FIG. 6 is a perspective view of the two housing sections for the first embodiment of the insulator housing.
Figure 7:
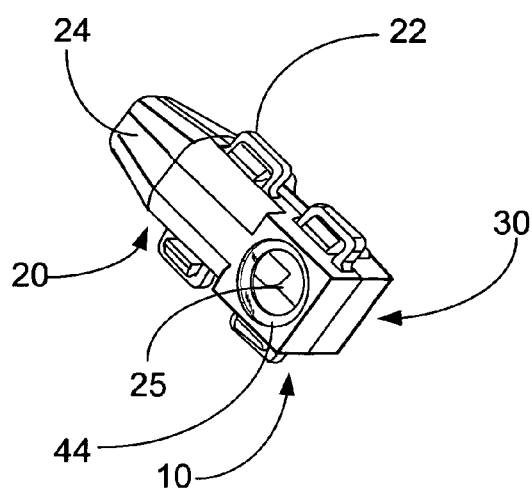
FIG. 7 is a perspective view of the two housing sections for the first embodiment of the insulator housing.

FIGS. 6 and 7 show the two housing sections 20, 30 after they have been joined together to form the insulator housing 10. The apertures 25, 35 of the two housing sections 20, 30 correspond so that when the housing 10 is placed over a connector 90, an elongated metal bar 80 passing through the aperture 92 in the connector 90 will also pass through the apertures 25, 35 in the housing 10 (see FIGS. 11-13). FIGS. 6 and 7 also show the latching members 32 on the second housing section 30 engaging the slots 22 on the first housing section 20. The fingers 23, 33 of the end portions 24, 34 of the two housing sections 20, 30 extend inwardly to contact the wire/cable 82 that is inserted into the connector 90 (see FIG. 13). FIGS. 6 and 7 show a preferred embodiment that includes a protruding ring 42 on the second housing section 30 and a mating recess 44 on the first housing section 20. The protruding ring 42 fits within the recess 44 of an adjacent insulator housing 10 when two such housings 10 abut each other on a metal rod 80 (see FIG. 13). This protruding ring 42 extends co-axially with the metal rod 80 and contacts the recess 44 on an adjacent housing 10 so as to cover and isolate the rod 80 between the housings 10. The circular shape of the protruding ring 42 and the mating recess 44 permit the individual housings 10 to rotate with respect to each other while still insulating and isolating the metal rod 80 between the housings 10. The protruding ring 42 and recess 44 permit adjoining insulator housings 10 to either fit tightly against each other or to have a loose fit or gap, while still protecting and isolating the metal rod 80 from contact with foreign objects or personnel. In other embodiments, the apertures 25, 35 are substantially coplanar with the side walls 29, 39 and abut spacers 86 (see FIG. 9) placed between adjacent insulators housings 10.

Figure 8:
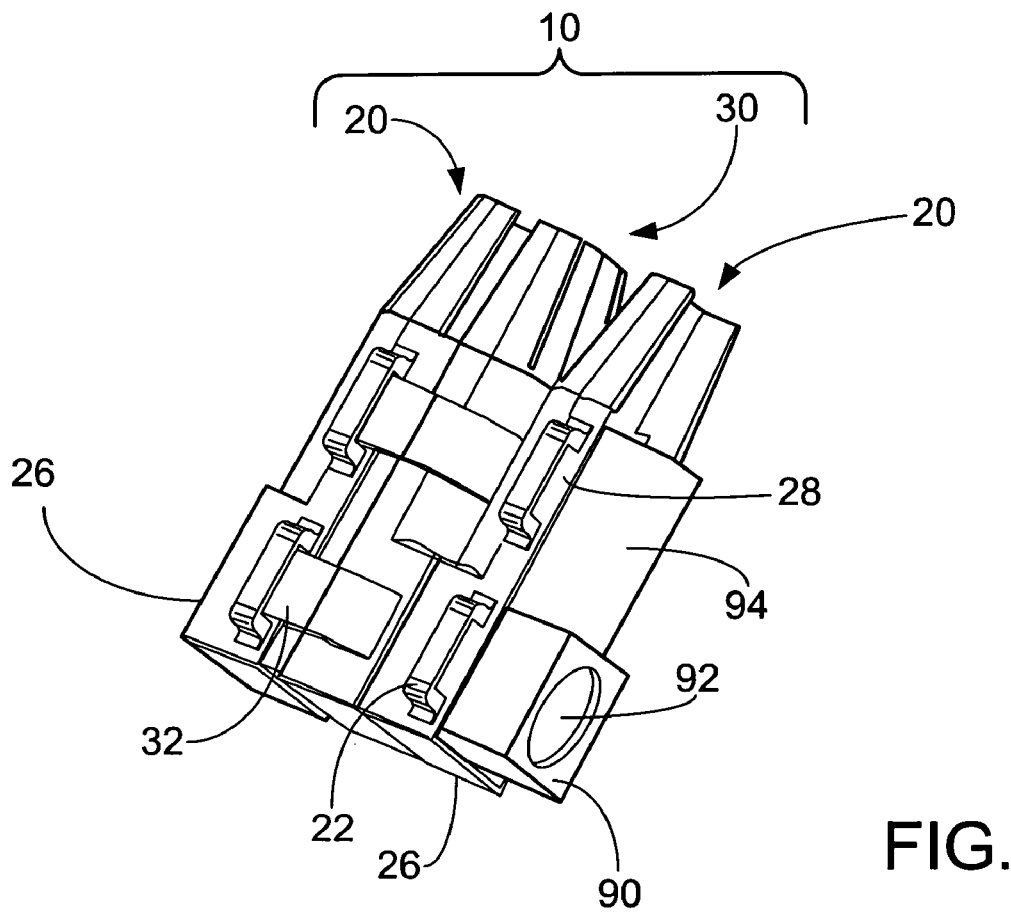
FIG. 8 shows an insulator housing formed from the housing sections shown in FIGS. 6 and 7 and an angle connector installed in a housing section.

FIG. 8 shows an insulator housing 10 formed by first and second housing sections 20, 30 adjacent to a first housing section 20 with a connector 90 installed therein. The base portion 26 of the first housing section 20 corresponds to the body of the connector 90 and the mid-portion 28 corresponds to the compression fitting 94 of the connector 90. FIG. 8 illustrates how the insulator housings 10 of the present invention allow two or more connectors 90 to be spaced closely together with the protruding ring 42 (see FIG. 6) of one housing 10 mating with the recess 44 (see FIG. 7) of the adjacent housing 10.

Figure 9:
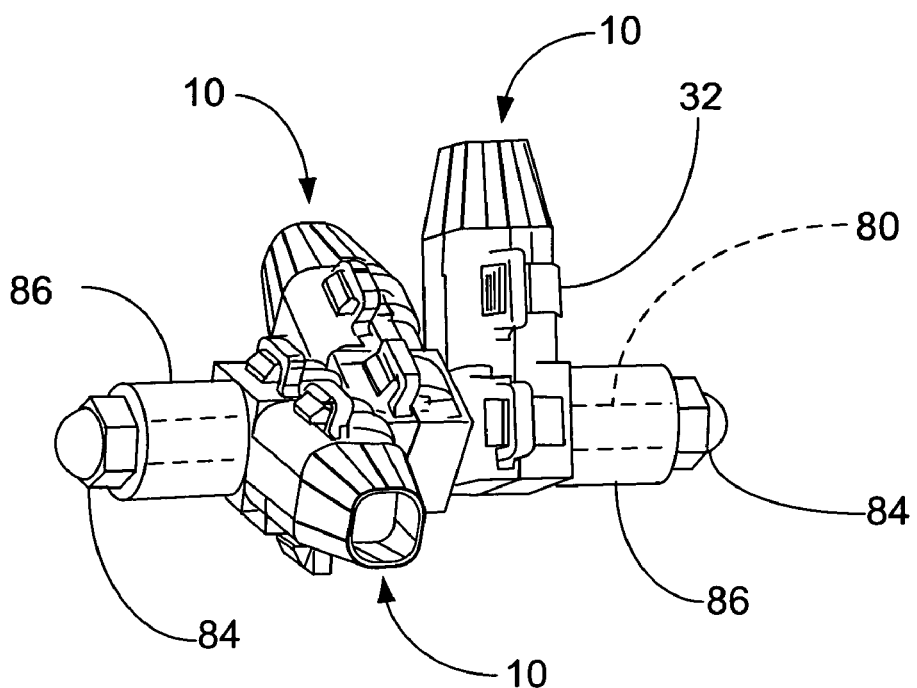
FIG. 9 shows an insulator housing assembly with three angle connectors in insulator housings installed on a metal rod.

FIG. 9 shows three insulator housings 10 enclosing connectors 90 (not shown) which are mounted on an elongated metal rod 80. Each of the housings 10 is orientated at a different angle to allow wires/cables to be easily connected from any direction. In addition to the housings 10, the metal rod 80 is covered by insulated spacers 86 and has a pair of insulated nuts 84 on the ends which prevent the metal rod 80 from being accidentally contacted. The diameter of the insulated spacers 86 is selected so that the ends fit over the protruding ring 42 (see FIG. 6) and recess 44 (see FIG. 7) of the insulator housing 10 and contact the side walls 29, 39 of the base portions 26, 36 when the insulated nuts 84 are tightened. As shown in FIG. 9, tightening the insulated nuts 84 completely encloses and electrically isolates the metal rod 80 when the lengths of the insulated spacers 86 are properly selected.

Figure 10:
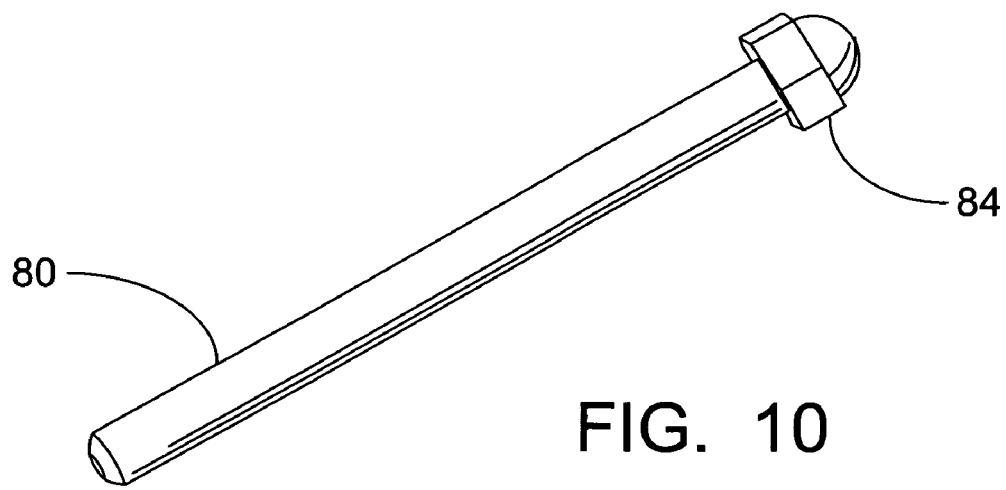
FIG. 10 shows a metal rod with an insulated nut.
Figure 11:
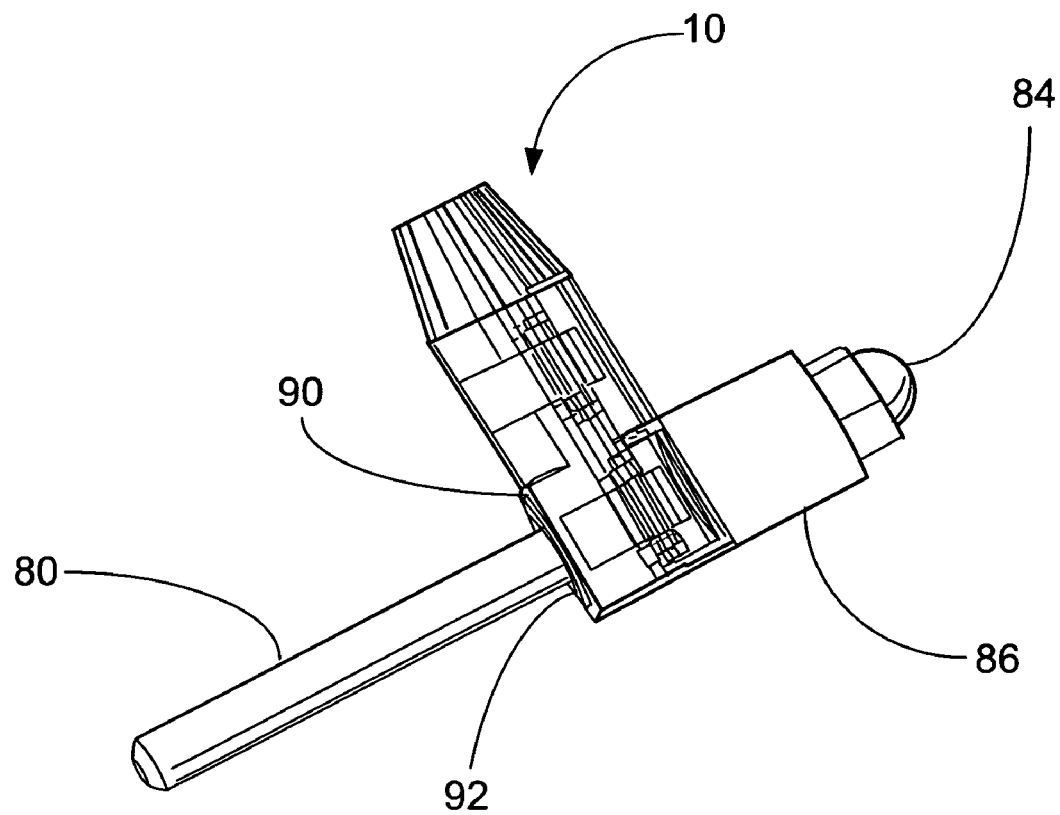
FIG. 11 shows an insulator housing assembly with an angle connector in an insulator housing installed on a metal rod.

FIG. 10 shows a metal rod 80 with an insulated nut 84 on one of the ends. FIG. 11 shows an insulated spacer 86 adjacent to the insulated nut 84. The insulator housing 10 is installed by inserting the metal rod 80 into the aperture 92 in the connector 90 and sliding the connector 90 along the metal rod 80 to the desired location. The insulated spacer 86 is sized to allow the connector 90 to be positioned at the desired location. Additional insulated spacers 86 and connectors 90 with insulator housings 10 can be positioned on the metal rod 80 as needed.

Figure 12:
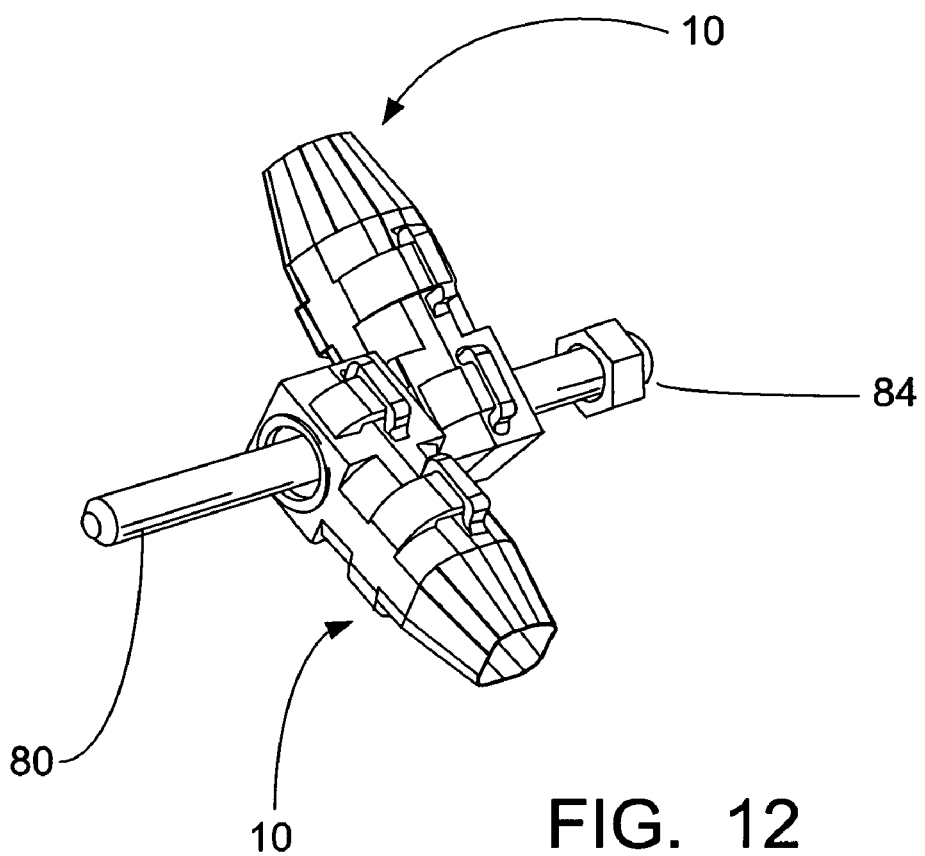
FIG. 12 shows an insulator housing assembly with two angle connectors in insulator housings installed on a metal rod at different angles.
Figure 13:
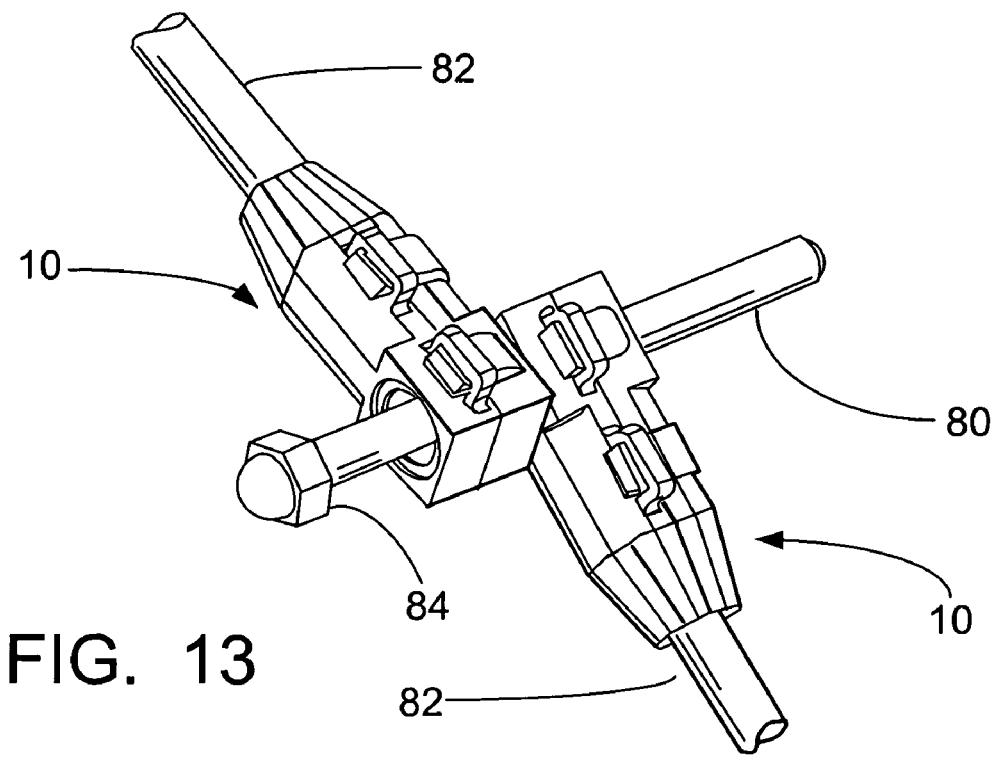
FIG. 13 shows an insulator housing assembly with two angle connectors in insulator housings connected to cables and installed on a metal rod at different angles.

FIGS. 12 and 13 show a pair of insulator housings 10 with connectors 90 (not shown) housed therein and mounted on a metal rod 80 with one end capped by an insulated nut 84. These figures illustrate how the connectors 90 can be freely rotate around the axis of the metal rod 80 to connect wires/cables 82 from any direction.

Figure 14:
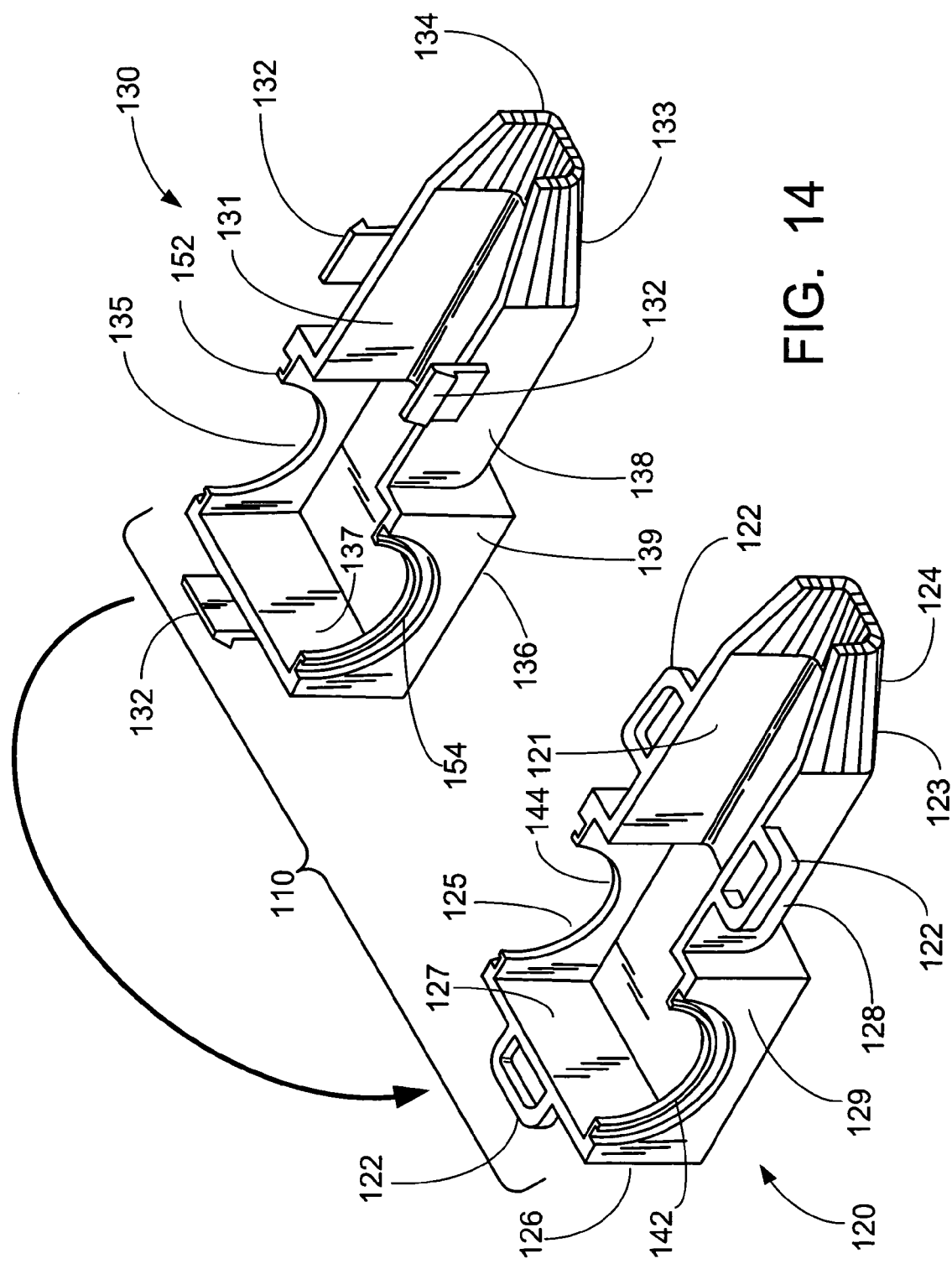
FIG. 14 shows a second embodiment of the insulator housing with first and second housing sections.

FIG. 14 shows an embodiment of the insulator housing 110 having first and second housing sections 120, 130. The first housing section 120 has three portions along its longitudinal axis: the first or base portion 126, which is substantially rectangular in shape; the second or mid-portion 128; and the third or end portion 124 formed by a plurality of fingers 123 that extend inwardly. A plurality of slots 122 for attaching the first housing section 120 to the second housing section 130 are located along the edge of the opening 121 of the mid-portion 128 and the base portion 126. The base portion 126 has a substantially flat end wall 127 with three substantially flat, adjacent side walls 129 extending from three sides of the end wall 127 and an open side 121 opposite the middle side wall 129. The two opposing side walls 129 have a substantially semi-circular opening 125 extending from the edge along the open side 121. One of the semi-circular openings 125 has a raised lip 142 along the edge and the semi-circular opening 125 on the opposing side wall 129 has a recessed groove 144 along the edge. The mid-portion 128 can be formed by a plurality of substantially flat surfaces or a curved wall that extends about 180 degrees between the opposing side edges.

The second housing section 130 shown in FIG. 14 is substantially the same as the first housing section 120 and has three portions along its longitudinal axis: the first or base portion 136, which is substantially rectangular in shape; the second or mid-portion 138; and the third or end portion 134 formed by a plurality of fingers 133 that extend inwardly. In addition, the second housing section 130 has a plurality of latching members 132 located along the edge of the opening 131 of the mid-portion 138 and the base portion 136, which correspond with the slots 122 on the first housing section 120. The base portion 136 has a substantially flat end wall 137 with three substantially flat, adjacent side walls 139 extending from three sides of the end wall 137 and an open side 131 opposite the middle side wall 139. The two opposing side walls 139 have a substantially semi-circular opening 135 extending from the edge along the open side 131. One of the semi-circular openings 135 has a raised lip 152 along the edge and the semi-circular opening 135 on the opposing side wall 139 has a recessed groove 154 along the edge. The mid-portion 138 can be formed by a plurality of substantially flat surfaces or a curved wall that extends about 180 degrees between the opposing side edges.

When the first housing section 120 and the second housing section 130 are placed around a connector (not shown), the latching members 132 engage the slots 122 and the semi-circular openings 125, 135 form an aperture on opposing sides of the insulator 110. In addition, the raised lips 142, 152 form a continuous lip (not shown) on one side of the insulator 110 and the recessed grooves 144, 154 form a continuous groove (not shown) on the other side of the insulator 110. When insulators 110 are installed next to each other, the raised lip 142, 152 of one insulator 110 engage the recessed groove 144, 154 of the adjacent insulator 110.

Figure 15:
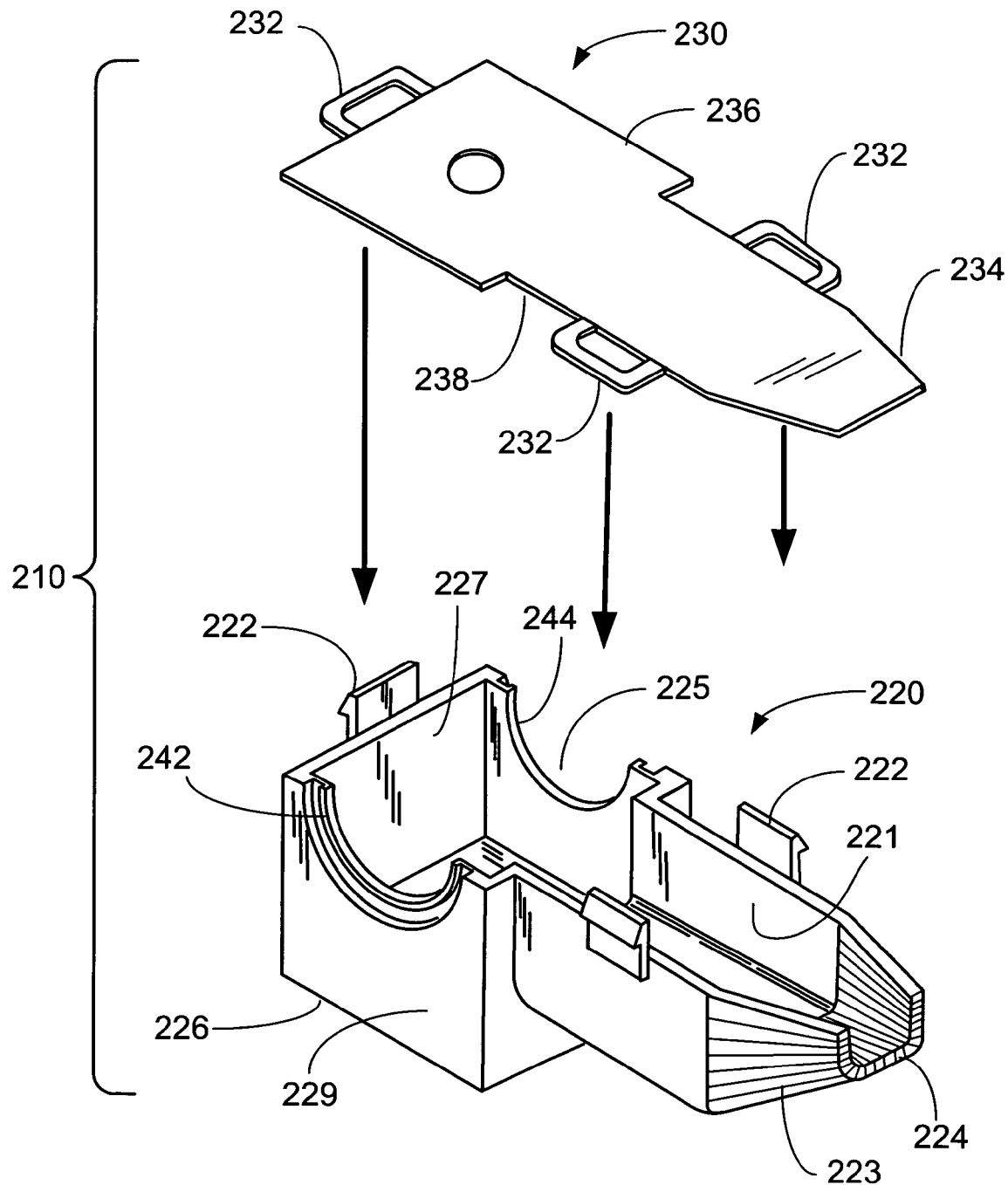
FIG. 15 shows a third embodiment of the insulator housing formed from a housing section and a lid having female connectors.

FIG. 15 shows another embodiment of the insulator housing 210 having a housing section 220 and a lid 230. The housing section 220 has three portions along its longitudinal axis: the first or base portion 226, which is substantially rectangular in shape; the second or mid-portion 228; and the third or end portion 224 formed by a plurality of fingers 223 that extend inwardly. Latches 222 for attaching the housing section 220 to the lid 230 are located along the edge of the opening 221 of the mid-portion 228 and the base portion 226. The base portion 226 has a substantially flat end wall 227 with three substantially flat side walls 229 extending from three sides of the end wall 227 and an open side 221 opposite one of the side wall 229. The two opposing side walls 229 have a substantially semi-circular opening 225 extending from the edge along the open side 221. One of the semi-circular openings 225 has a raised lip 242 along the edge and the semi-circular opening 225 on the opposing side wall 229 has a recessed groove 244 along the edge. The mid-portion 228 can be formed by a plurality of substantially flat surfaces or a curved wall that extends about 180 degrees between the opposing side edges.

The lid 230 shown in FIG. 15 is substantially flat and has three portions along its longitudinal axis. The first portion 236 corresponds to the base portion 226 of the housing section 220, the second portion 238 corresponds to the mid-portion 228 and the third portion 234 corresponds to the end portion 224. In addition, the lid 230 has a plurality of slots 232 located along the edge of the first portion 236 and the second portion 236, which correspond with the latches 222 on the housing section 220. After the housing section 220 is placed around a connector (not shown), the lid 230 is placed over the housing section 220 so that the latches 222 on the housing section 220 engage the slots 232 on the lid 230. When insulators 210 are installed next to each other, the raised lip 242 of one insulator 210 engages the recessed groove 244 of the adjacent insulator 210. In other embodiments, the edges around the semi-circular openings 225 are coplanar with the side walls 229 and spacers 86 (see FIG. 9) are installed between adjacent insulators 210.

Figure 16:
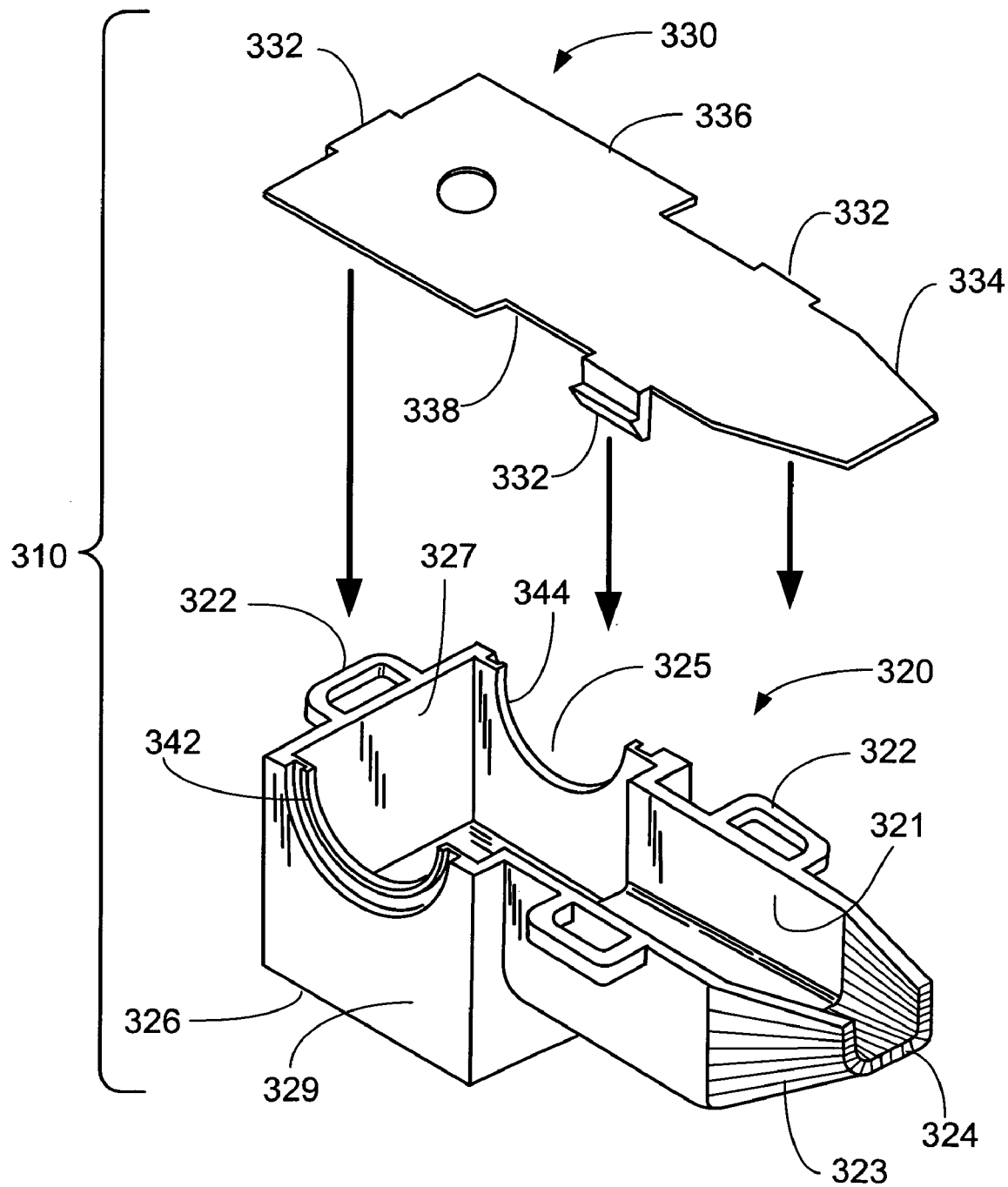
FIG. 16 shows a third embodiment of the insulator housing formed from a housing section and a lid having male connectors.

FIG. 16 shows another embodiment of the insulator housing 310 having a housing section 320 and a lid 330. The housing section 320 has three portions along its longitudinal axis. The first or base portion 326, which is substantially rectangular in shape, the second or mid-portion 328 and the third or end portion 324 formed by a plurality of fingers 323 that extend inwardly. Slots 322 for attaching the housing section 320 to the lid 330 are located along the edge of the opening 321 of the mid-portion 328 and the base portion 326. The base portion 326 has a substantially flat end wall 327 with three substantially flat side walls 329 extending from three sides of the end wall 327 and an open side 321 opposite the middle side wall 329. The two opposing side walls 329 have a substantially semi-circular opening 325 extending from the edge along the open side 321. One of the semi-circular openings 325 has a raised lip 342 along the edge and the semi-circular opening 325 on the opposing side wall 329 has a recessed groove 344 along the edge. The mid-portion 328 can be formed by a plurality of substantially flat surfaces or a curved wall that extends about 180 degrees between the opposing side edges.

The lid 330 shown in FIG. 16 is substantially flat and has three portions along its longitudinal axis. The first portion 336 corresponds to the base portion 326 of the housing section 320, the second portion 338 corresponds to the mid-portion 328 and the third portion 334 corresponds to the end portion 324. In addition, the lid 330 has a plurality of latches 332 located along the edge of the first portion 336 and the second portion 336, which correspond with the slots 322 on the housing section 320. After the housing section 320 is placed around a connector (not shown), the lid 330 is placed over the housing section 320 so that the latches 332 on the lid 330 engage the slots 322 on the housing section 320. When insulators 310 are installed next to each other, the raised lip 342 of one insulator 310 engage the recessed groove 344 of the adjacent insulator 310.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:
1. A repositionable insulator housing for an angle connector, the repositionable insulator housing comprising:

a first housing section having a first exterior surface and comprising a first end wall and a first pair of opposing side walls extending from a first back wall to form a first open side and a first open end, and wherein the first back wall has a first aperture; and a second housing section having a second exterior surface and comprising a second end wall and a second pair of opposing side walls extending from a second back wall to form a second open side and a second open end, wherein the second back wall has a second aperture, wherein the housing is formed by joining the first and second housing sections together so that the first open side encloses the second open side, wherein the first and second open ends form an opening in the housing and the first end wall and the second end wall form a closed end of the housing, and wherein the first and second apertures are aligned and on opposite sides of the housing adapted to receive an elongated metal rod and the opening is adapted to receive a conductor.

2. The repositionable insulator housing according to claim 1, wherein the first housing section comprises a first plurality of fingers extending from the first back wall and the first pair of opposing side walls at the first open end, and wherein the second housing section comprises a second plurality of fingers extending from the second back wall and the second pair of opposing side walls at the second open end.

3. The repositionable insulator housing according to claim 2, wherein each of the first plurality of fingers and each of the second plurality of fingers has a base and a tip opposite the base, wherein the base is joined to the first or second pairs of opposing side walls or the first or second back walls, and wherein the tips of the first and second plurality of fingers define the opening in the housing.

4. The repositionable insulator housing according to claim 1, wherein one or more slots are formed on the first exterior surface and/or the second exterior surface, and wherein one or more cable ties are received by the one or more slots to secure the first and second housing sections together.

5. The repositionable insulator housing according to claim 1, wherein one or more slots or latching members are formed on the first exterior surface and one or more slots or latching members are formed on the second exterior surface, and wherein the one or more latching members engage the one or more slots to secure the first and second housing sections together.

6. The repositionable insulator housing according to claim 1, wherein the first and second housing sections are made from an electrically insulating material.

7. The repositionable insulator housing according to claim 1, wherein the first and second housing sections are made from a polyethylene, a polypropylene, a polycarbonate or nylon.

8. The repositionable insulator housing according to claim 1, wherein the first open side is defined by a first edge and the second open side is defined by a second edge, and wherein the first and second housing sections are joined together by contacting the first and second edges.

9. A repositionable insulator housing for an angle connector, the repositionable insulator housing comprising:

a first housing section having a first exterior surface and a first base portion, the first base portion comprising a first back wall, a first end wall opposite a first open end and a first pair of opposing side walls, wherein the first end wall and the first pair of opposing side walls extend from the first back wall to a first edge, and wherein corresponding portions of the first edge on the first pair of opposing side walls are concave and have a substantially semi-circular shape; and a second housing section having a second exterior surface and a second base portion, the second base portion comprising a second back wall, a second end wall opposite a second open end and a second pair of opposing side walls, wherein the second end wall and the second pair of opposing side walls extend from the second back wall to a second edge, and wherein corresponding portions of the second edge on the second pair of opposing side walls are concave and have a substantially semi-circular shape, wherein the first and second housing sections are joined together so that the first edge correspondingly contacts the second edge to form the insulator housing, wherein the first and second open ends form an opening in the housing and the first and second end walls form a closed end of the housing, wherein the first and second concave edges define a pair of apertures, and wherein the apertures are aligned and in opposite side walls of the housing adapted to receive an elongated metal rod and the opening is adapted to receive an electrical conductor.

10. The repositionable insulator housing according to claim 9, wherein the first housing section further comprises a first transitional wall having a first opening opposite the first end wall and the second housing section further comprises a second transitional wall having a second opening opposite the second end wall, and wherein a first mid-portion extends from the first transitional wall and is in communication with the first base portion through the first opening and a second mid-portion extends from the second transitional wall and is in communication with the second base portion through the second opening.

11. The repositionable insulator housing according to claim 10, wherein the first housing section comprises a first plurality of fingers extending from the end of the first mid-portion opposite the first transitional wall, and wherein the second housing section comprises a second plurality of fingers extending from the end of the second mid-portion opposite the second transitional wall.

12. The repositionable insulator housing according to claim 11, wherein each of the first plurality of fingers and each of the second plurality of fingers has a base and a tip opposite the base, wherein each of the bases is joined to the first or second mid-portion, and wherein the tips of the first and second plurality of fingers define an insulator housing opening when the first and second housing sections are joined together.

13. The repositionable insulator housing according to claim 9, wherein one or more slots are formed on the first and/or second exterior surface(s), and wherein one or more cable ties are received by the one or more slots to secure the first and second housing sections together.

14. The repositionable insulator housing according to claim 9, wherein one or more slots or latching members are formed on the first exterior surface and one or more slots or latching members are formed on the second exterior surface, and wherein the one or more latching members engage the one or more slots to secure the first and second housing sections together.

15. The repositionable insulator housing according to claim 9, wherein the first and second housing sections are made from an electrically insulating material.

16. The repositionable insulator housing according to claim 9, wherein the first and second housing sections are made from a polyethylene, a polypropylene, a polycarbonate or nylon.

17. A repositionable insulator housing for an angle connector, the repositionable insulator housing comprising:
 a housing section having an exterior surface and a base portion, the base portion comprising a back wall, an end wall opposite an open end and a pair of opposing side walls connected to the end wall, wherein the end wall and the pair of opposing side walls extend from the back wall to an edge, wherein the edge defines an opening in the housing and wherein portions of the edge corresponding to the opposing side walls are concave; and
 a substantially flat lid comprising a top surface and an outer perimeter that substantially corresponds to and contacts the edge of the housing,
 wherein the housing section and the lid are joined together so that the outer perimeter contacts the edge to form the insulator housing, wherein the open end forms an opening in the housing and the end wall forms a closed end of the housing, wherein the lid and the first and second concave edges define a pair of apertures and wherein the pair of apertures are aligned and in opposite sides of the insulator housing adapted to receive an elongated metal rod and the opening is adapted to receive an electrical conductor.

18. The repositionable insulator housing according to claim 17, wherein the housing section further comprises a transitional wall having an opening opposite the end wall, and wherein a first mid-portion extends from the transitional wall and is in communication with the base portion through the opening.

19. The repositionable insulator housing according to claim 18, wherein the housing section comprises a plurality of fingers extending from the end of the mid-portion opposite the transitional wall.

20. The repositionable insulator housing according to claim 19, wherein each of the plurality of fingers has a base and a tip opposite the base, wherein each of the bases is joined to the mid-portion, and wherein the tips of the plurality of fingers define an insulator housing opening when the lid and the housing section are joined together.

21. The repositionable insulator housing according to claim 17, wherein one or more slots are formed on the exterior surface, and wherein one or more cable ties are received by the one or more slots to secure the lid and the housing section together.

22. The repositionable insulator housing according to claim 17, wherein one or more slots are formed on the exterior surface of the housing which correspond to one or more latching members formed on the perimeter of the lid, or one or more latching members are formed on the exterior surface of the housing which correspond to one or more slots on the perimeter of the lid, and wherein the one or more latching members engage the one or more slots to secure the lid to the housing section.

23. The repositionable insulator housing according to claim 17, wherein the housing section and lid are made from an electrically insulating material.

24. The repositionable insulator housing according to claim 17, wherein the housing section and lid are made from a polyethylene, a polypropylene, a polycarbonate or nylon.

25. A repositionable insulator housing assembly for angle connectors, the assembly comprising:
 one or more angle connectors, wherein each angle connector has an aperture extending therethrough;
 one or more repositionable insulator housings, wherein each insulator housing comprises:
  a first housing section having a first exterior surface and a first base portion, the base portion comprising a first back wall, a first end wall opposite a first open end and a first pair of opposing side walls, wherein the first end wall and the first pair of opposing side walls extend from the first back wall to a first edge, and wherein the first back wall comprises a first aperture or portions of the first edge corresponding to the first pair of opposing side walls are concave and have a substantially semi-circular shape; and
  a second housing section having a second exterior surface and a second base portion, the second base portion comprising a second back wall, a second end wall opposite a second open end and a second pair of opposing side walls, wherein the second end wall and the second pair of opposing side walls extend from the second back wall to a second edge, and wherein the second back wall comprises a second aperture or portions of the second edge corresponding to the second pair of opposing side walls are concave and have a substantially semi-circular shape,
  wherein the first and second housing sections are joined together so that the first edge correspondingly contacts the second edge to form the insulator housing, wherein the first and second open ends form an opening in the housing and the first and second end walls form a closed end of the housing, and a pair of metal rod openings is formed by the first and second apertures or the first and second concave edges in the opposing side walls of the insulator housing, and wherein the insulator housing is adapted to accommodate an angle connector; and
 an elongated metal rod comprising a first end, a second end and a longitudinal axis, wherein the elongated metal rod extends through the aperture and electrically contacts each of the one or more angle connectors, and wherein the elongated metal rod passes through the pair of metal rod openings of each of the one or more repositionable insulator housings,
 wherein the one or more angle connectors are rotatable around the longitudinal axis of the elongated metal rod.

26. The repositionable insulator housing assembly according to claim 25, further comprising an electrically insulated cap on at least one end of the elongated metal rod.

27. The repositionable insulator housing assembly according to claim 25, wherein the first housing section or the second housing section further comprises one or more slots on the first exterior surface or the second exterior surface, and wherein the housing assembly further comprises one or more cable ties extending through the one or more slots to secure the first and second housing sections together.

28. The repositionable insulator housing assembly according to claim 25, wherein the first housing section further comprises one or more slots or one or more latching members on the first exterior surface and the second housing section further comprises one or more slots or one or more latching members on the second exterior surface, and wherein the one or more latching members engage the one or more slots to secure the first housing section to the second housing section.

29. The repositionable insulator housing assembly according to claim 25, wherein the first and second housing sections are made from an electrically insulating material.

30. The repositionable insulator housing assembly according to claim 25, wherein the assembly further comprises one or more electrically insulated spacers, wherein the insulated spacers have an opening for receiving the elongated metal rod and are positioned on the rod between adjacent angle connectors or between an angle connector and an electrically insulated cap on an end of the elongated metal rod.

31. A repositionable insulator housing kit for angle connectors, the kit comprising:
- one or more repositionable insulator housings, wherein each insulator housing comprises:
  - a first housing section having a first exterior surface and a first base portion formed by a first plurality of adjoining walls and in communication with a first opening defined by a first plurality of flexible fingers via a first mid-portion, wherein the first plurality of adjoining walls defines a first closed end and a first open side; and
  - a second housing section having a second exterior surface and a second base portion formed by a second plurality of adjoining walls and in communication with a second opening defined by a second plurality of flexible fingers via a second mid-portion, wherein the second plurality of adjoining walls defines a second closed end and a second open side;
  - wherein the insulator housing is formed by joining the first and second housing sections together so that the first open side encloses the second open side, and wherein the insulator housing comprises a base section having a closed end, a plurality of opposing side walls, a pair of apertures in two opposing side walls, a mid-section and a housing opening opposite the closed end and defined by the first and second plurality of flexible fingers;
- one or more electrically insulated caps, wherein each insulated cap has an opening for receiving an end of an elongated metal rod; and
- one or more electrically insulated spacers, wherein each insulated spacer has an opening therethrough for the passage of the elongated metal rod.

* * * * *